(12) United States Patent
Kobayashi et al.

(10) Patent No.: US 10,309,407 B2
(45) Date of Patent: Jun. 4, 2019

(54) COMPRESSOR SYSTEM

(71) Applicant: MITSUBISHI HEAVY INDUSTRIES COMPRESSOR CORPORATION, Tokyo (JP)

(72) Inventors: Masahiro Kobayashi, Hiroshima (JP); Yasushi Mori, Hiroshima (JP); Takeshi Hataya, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 347 days.

(21) Appl. No.: 15/329,500

(22) PCT Filed: Sep. 18, 2014

(86) PCT No.: PCT/JP2014/074696
§ 371 (c)(1),
(2) Date: Jan. 26, 2017

(87) PCT Pub. No.: WO2016/042639
PCT Pub. Date: Mar. 24, 2016

(65) Prior Publication Data
US 2017/0218963 A1    Aug. 3, 2017

(51) Int. Cl.
*F04D 25/16* (2006.01)
*F04D 27/00* (2006.01)
(Continued)

(52) U.S. Cl.
CPC ............ *F04D 25/16* (2013.01); *F04B 41/06* (2013.01); *F04D 27/004* (2013.01); *F04D 27/0261* (2013.01)

(58) Field of Classification Search
CPC ........ F04D 17/10; F04D 17/12; F04D 17/122; F04D 25/16; F04D 25/163;
(Continued)

(56) References Cited

U.S. PATENT DOCUMENTS 5,154,571 A * 10/1992 Prumper ............... F04D 25/02
                                                    415/124.1
5,382,132 A * 1/1995 Mendel ................. F04D 25/163
                                                    415/122.1
(Continued)

FOREIGN PATENT DOCUMENTS

CN         1444703 A      9/2003
CN         102421991 A    4/2012
(Continued)

OTHER PUBLICATIONS

International Search Report dated Dec. 16, 2014 issued in PCT/JP2014/074696 with English Translation.
(Continued)

*Primary Examiner* — Igor Kershteyn
(74) *Attorney, Agent, or Firm* — Birch, Stewart, Kolasch & Birch, LLP

(57) ABSTRACT

This compressor system is provided with: a driving machine having a rotary-driven first output shaft and a second shaft that is rotary driven so as to reach the same speed as the first output shaft; a working-fluid-compressing first compressor to which the rotation of the first output shaft is transmitted; a working-fluid-compressing second compressor to which the rotation of the second output shaft is transmitted; a variable-speed step-up gear for increasing the speed of the first output shaft and transmitting the increased speed to the first compressor, said step-up gear being capable of varying the increased speed; and a constant-speed step-up gear for increasing the speed of the second output shaft and transmitting the increased speed to the second compressor, said step-up gear keeping the increased speed constant.

5 Claims, 10 Drawing Sheets

(51) Int. Cl.
 *F04B 41/06* (2006.01)
 *F04D 27/02* (2006.01)
(58) Field of Classification Search
 CPC ............. F04D 27/0261; F04D 27/0269; F04D 27/004; F04D 29/054; F04B 41/06
 See application file for complete search history.

(56) References Cited

U.S. PATENT DOCUMENTS

| | | | | |
|---|---|---|---|---|
| 5,490,760 | A * | 2/1996 | Kotzur | F01D 15/12 415/115 |
| 6,393,865 | B1 * | 5/2002 | Coakley | F25J 3/04018 62/643 |
| 6,484,533 | B1 * | 11/2002 | Allam | F25J 1/0012 62/643 |
| 2008/0264061 | A1 * | 10/2008 | Wickert | F04D 25/16 60/670 |
| 2010/0098534 | A1 * | 4/2010 | Small | F04D 17/12 415/204 |
| 2012/0107108 | A1 | 5/2012 | Nagao et al. | |
| 2013/0121846 | A1 * | 5/2013 | Gilarranz | F04D 17/12 417/53 |
| 2014/0161588 | A1 | 6/2014 | Miyata et al. | |
| 2015/0044061 | A1 * | 2/2015 | Hutten | F04D 25/06 417/42 |
| 2016/0186764 | A1 * | 6/2016 | Lissoni | F04D 17/105 417/53 |

FOREIGN PATENT DOCUMENTS

| | | |
|---|---|---|
| CN | 202326326 U | 7/2012 |
| CN | 202579249 U | 12/2012 |
| CN | 103620227 A | 3/2014 |
| EP | 2083172 A1 | 7/2009 |
| JP | 10-246198 A | 9/1998 |
| JP | 2000-505525 A | 5/2000 |
| JP | 2008-45401 A | 2/2006 |
| WO | WO 99/49222 A1 | 9/1999 |

OTHER PUBLICATIONS

Written Opinion dated Dec. 16, 2014 issued in PCT/JP2014/074696 with English Translation.

* cited by examiner

COMPRESSOR SYSTEM

TECHNICAL FIELD

The present invention relates to a compressor system configured to drive a plurality of compressors using one driving machine.

BACKGROUND ART

As a compressor such as an axial flow compressor, a centrifugal compressor, or the like, configured to generate compressed fluids used as various driving sources, a compressor driven by a driving machine (a motor) is provided (for example, see Patent Literature 1).

CITATION LIST

Patent Literature

[Patent Literature 1]
Published Japanese Translation No. 2000-505525 of the PCT International Publication

SUMMARY OF INVENTION

Technical Problem

Incidentally, there is a compressor system in which a high pressure side compressor and a low pressure side compressor are serially connected to one driving machine via a step-up gear or a reduction gear and the two compressors are driven by the driving machine. Then, in the above-mentioned compressor system, in a state in which an outlet pressure of a working fluid delivered from the high pressure side compressor and the low pressure side compressor is constant, the compressor system should be operated in a wide operating range.

The present invention is directed to provide a compressor system capable of securing a wider range of operating condition and performing a stable operation even when an operation is performed at a constant outlet pressure in a configuration in which a plurality of compressors are driven by one driving machine.

Solution to Problem

According to a first aspect of the present invention, a compressor system includes a driving machine having a first output shaft that is rotatably driven, and a second output shaft that is rotatably driven to have the same rotational speed as the first output shaft; a first compressor configured to receive rotation of the first output shaft and compress a working fluid; a second compressor configured to receive rotation of the second output shaft and compress a working fluid; a variable speed step-up gear configured to increase the rotational speed of the first output shaft and transmit the increased rotational speed to the first compressor and vary the increased rotational speed; and a constant speed step-up gear configured to increase the rotational speed of the second output shaft to transmit the rotational speed to the second compressor and cause the increased rotational speed to be constant.

According to the above-mentioned configuration, when the compressor system is operated such that a constant outlet pressure is maintained, the compressor system can be operated in a wide operating range.

According to a second aspect of the present invention, in the compressor system, the first compressor of the compressor system of the first aspect may be a low pressure side compressor, and the second compressor may be a high pressure side compressor.

According to the above-mentioned configuration, a decrease in outlet pressure of the compressor system can be suppressed, and an output can be stably secured while widening an operating range.

According to a third aspect of the present invention, in the compressor system of the first or second aspect, the second compressor that compresses the working fluid by rotation may be operated at a circumferential speed of an impeller, which is a Mach number of 0.8 or less.

According to a fourth aspect of the present invention, in the compressor system of the third aspect, the second compressor may have at least six impellers configured to compress the working fluid by rotation.

According to the above-mentioned configuration, the second compressor may have a wide operating range that is flatter than that of the first compressor.

According to the fifth aspect of the present invention, in the compressor system, a head transmitted from the driving machine to the second compressor may occupies 60% or more of a total head transmitted from the driving machine obtained by summing a head transmitted to the first compressor and a head transmitted to the second compressor.

According to the above-mentioned configuration, when a flow rate is adjusted by the first compressor, a variation can be minimized as much as possible and a stable operation can be performed.

Advantageous Effects of Invention

According to the above-mentioned compressor system, as the rotational speed of the first compressor is varied and the rotational speed of the second compressor is constant, in the configuration in which a plurality of compressors are driven by the one driving machine, even when the operation is performed at a constant outlet pressure, a wider operating condition range can be secured and a stable operation can be performed.

DESCRIPTION OF EMBODIMENTS

Figure 1:
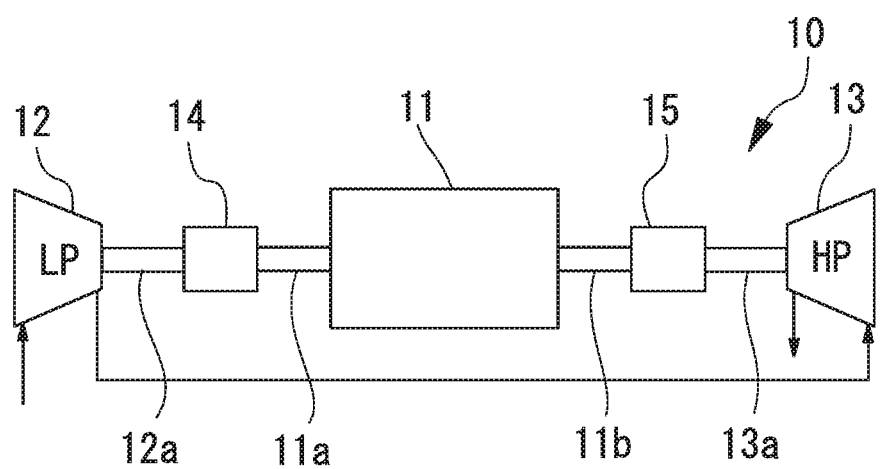
FIG. 1 is a view showing a schematic configuration of a compressor system according to an embodiment of the present invention.
Figure 2:
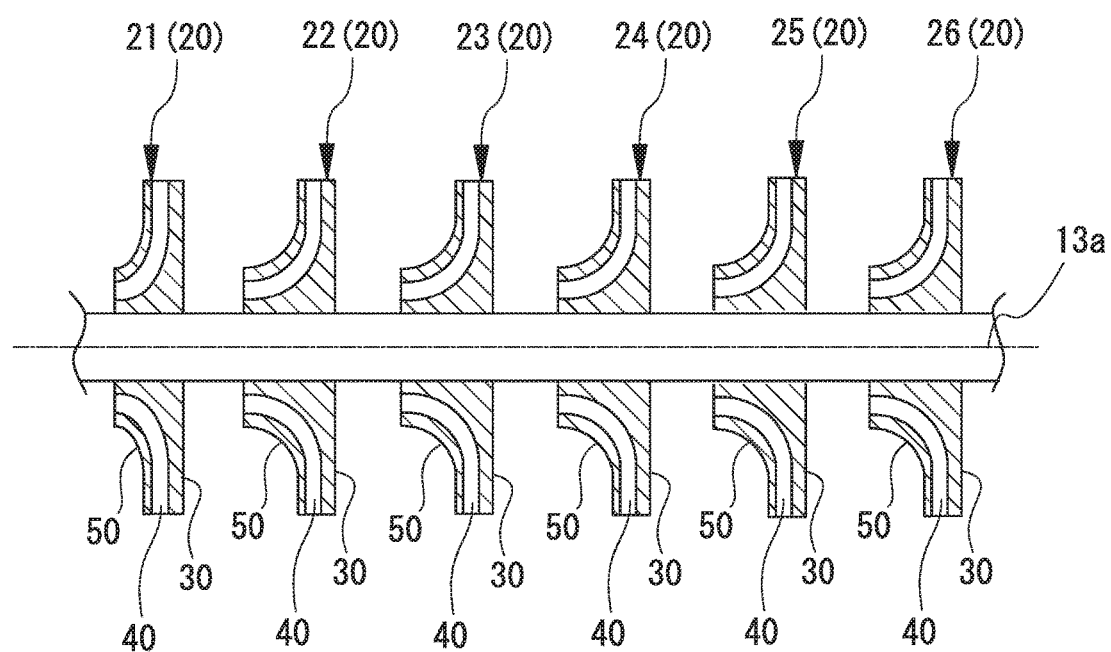
FIG. 2 is a view for describing a plurality of impellers disposed at a high pressure side compressor according to the embodiment of the present invention.
Figure 3:
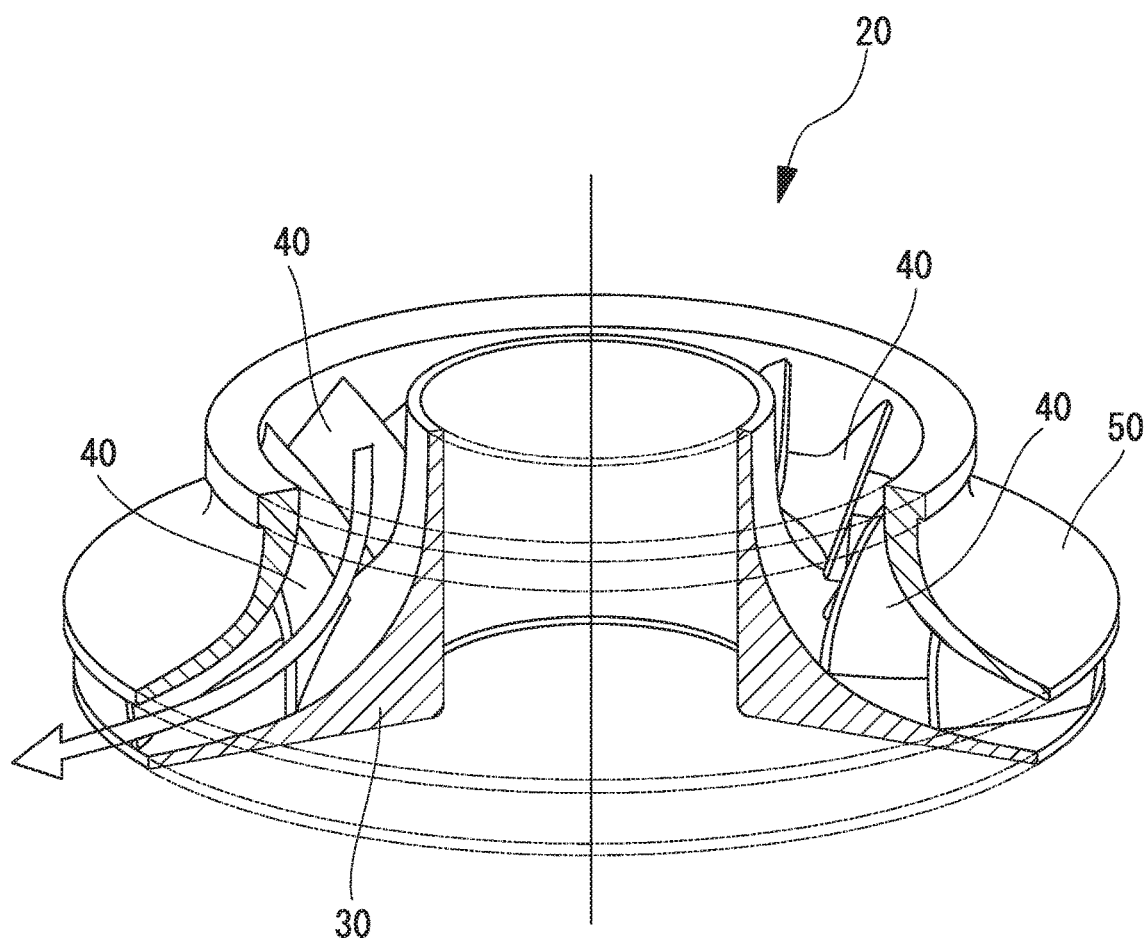
FIG. 3 is a view for describing the impellers used in a low pressure side compressor and a high pressure side compressor used in the embodiment of the present invention.
Figure 4A:
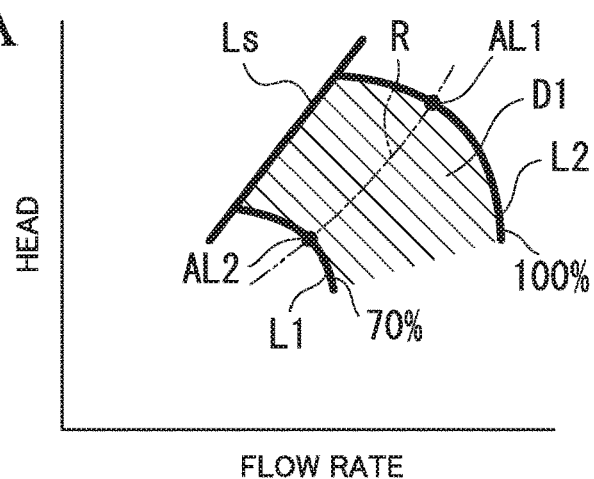
FIG. 4A is a view showing a relation between a flow rate and a head in the low pressure side compressor of the compressor system according to the embodiment of the present invention.
Figure 4B:
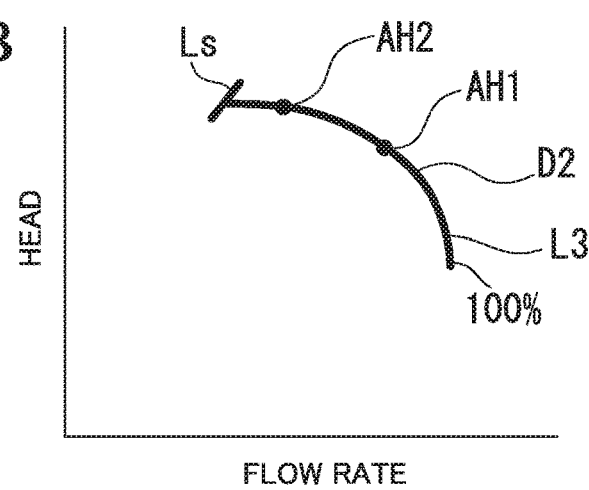
FIG. 4B is a view showing a relation between a flow rate and a head in the high pressure side compressor of the compressor system according to the embodiment of the present invention.
Figure 4C:
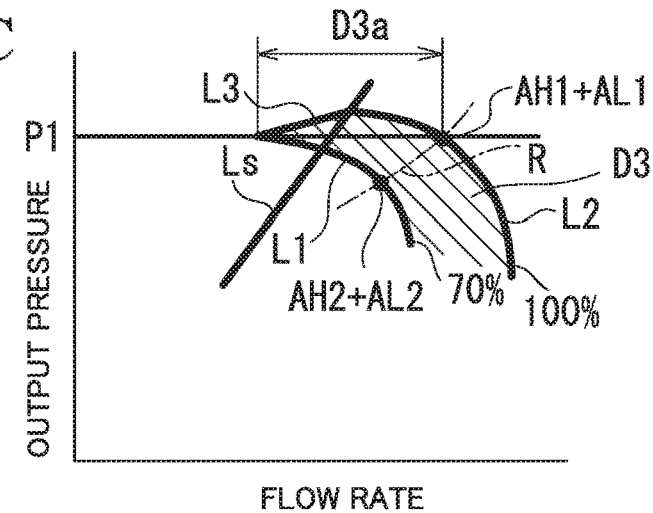
FIG. 4C is a view showing a relation between a flow rate and an outlet pressure in the compressor system according to the embodiment of the present invention.

FIG. 1 is a view showing a schematic configuration of a compressor system according to an embodiment of the present invention. FIG. 2 is a view for describing a plurality of impellers disposed at a high pressure side compressor according to the embodiment of the present invention. FIG. 3 is a view for describing the impellers used in a low pressure side compressor and a high pressure side compressor used in the embodiment of the present invention. FIG. 4A is a view showing a relation between a flow rate and a head in the low pressure side compressor of the compressor system according to the embodiment of the present invention. FIG. 4B is a view showing a relation between a flow rate and a head in the high pressure side compressor of the compressor system according to the embodiment of the present invention. FIG. 4C is a view showing a relation between a flow rate and an outlet pressure in the compressor system according to the embodiment of the present invention.

As shown in FIG. 1, a compressor system 10 of the embodiment includes a driving machine 11, a low pressure side compressor (a first compressor) 12, a high pressure side compressor (a second compressor) 13, a variable speed step-up gear 14, and a constant speed step-up gear 15.

The driving machine 11 serially connects two compressors via a step-up gear or a reduction gear and simultaneously drives the two compressors. The driving machine 11 has a first output shaft 11a that is rotatably driven, and a second output shaft 11b that is rotatably driven to have the same rotational speed as the first output shaft 11a. The driving machine 11 of the embodiment is an electric motor and always drives the first output shaft 11a and the second output shaft 11b at a constant speed. The driving machine 11 is disposed coaxially with the first output shaft 11a and the second output shaft 11b. The first output shaft 11a is disposed at an opposite side to the second output shaft 11b with a main body of the driving machine 11 interposed therebetween.

The low pressure side compressor 12 is driven by receiving rotation of the first output shaft 11a serving as an output shaft of one side (first side) of the driving machine 11. The low pressure side compressor 12 of the embodiment compresses a working fluid introduced from the outside and supplies the working fluid to an inlet side of the high pressure side compressor 13.

The high pressure side compressor 13 is driven by receiving rotation of the second output shaft 11b serving as an output shaft of the other side (second side) of the driving machine 11. The high pressure side compressor 13 compresses a working fluid at a higher pressure than that of the low pressure side compressor 12. The high pressure side compressor 13 of the embodiment further compresses the working fluid compressed by the low pressure side compressor 12. The high pressure side compressor 13 supplies a working fluid compressed through two steps to a process side via the low pressure side compressor 12.

The variable speed step-up gear 14 increases the rotational speed of the first output shaft 11a and transmits the rotational speed to the low pressure side compressor 12. The variable speed step-up gear 14 can vary the increased rotational speed. The variable speed step-up gear 14 of the embodiment is connected to a rotary shaft 12a of the low pressure side compressor 12. The variable speed step-up gear 14 of the embodiment can vary a speed increasing ratio. For example, provided that the driving machine 11 is operated at a constant speed and the rotational speed according to a rated power output serving as the rotational speed after the rotational speed of the first output shaft 11a is increased is 100%, the variable speed step-up gear 14 may vary the rotational speed, for example, from about 105% to 70% and transmit the varied rotational speed to the low pressure side compressor 12.

The constant speed step-up gear 15 increases the rotational speed of the second output shaft 11b and transmits the increased rotational speed to the high pressure side compressor 13. The constant speed step-up gear 15 of the embodiment is connected to a rotary shaft 13a of the high pressure side compressor 13. The constant speed step-up gear 15 constantly maintains the increased rotational speed. That is, in the constant speed step-up gear 15 of the embodiment, the speed increasing ratio is set to be constant. For example, the constant speed step-up gear 15 may increase the rotational speed of the first output shaft 11a to 100% that is the rotational speed according to the rated power output, and transmit the increased rotational speed to the high pressure side compressor 13.

In the low pressure side compressor 12 and the high pressure side compressor 13 of the embodiment, a plurality of impellers 20 are attached in parallel to the rotary shaft 12a and the rotary shaft 13a connected to the variable speed step-up gear 14 or the constant speed step-up gear 15.

Specifically, in the low pressure side compressor 12 and the high pressure side compressor 13, the plurality of impellers 20 are disposed in parallel at intervals in an axial direction in which the rotary shaft 12a and the rotary shaft 13a extend and are accommodated in a casing (not shown). For example, the high pressure side compressor 13 of the embodiment has, as shown in FIG. 2, six impellers 21, 22, 23, 24, 25 and 26 from a first stage impeller 21 disposed at the foremost stage of one side (first side) in an axial direction (a left side of the drawing of FIG. 2), in which the working fluid enters, to a sixth stage impeller 26 disposed at the rearmost stage of the other side (second side) in the axial direction (a right side of the drawing of FIG. 2), in which the working fluid exits.

As shown in FIG. 3, each of the impellers 21, 22, 23, 24, 25 and 26 has a disk 30 having a substantially circular plate shape, a plurality of blades 40 attached radially to be erected on a surface of the disk 30 and in parallel in a circumferential direction, and a cover 50 attached to cover the plurality of blades 40 in the circumferential direction.

Further, any one or all of the impellers 21, 22, 23, 24, 25 and 26 may be an open impeller in which the cover 50 is not provided.

In addition, the high pressure side compressor 13 operated via the constant speed step-up gear 15 having a constant speed may be provided such that a head performance is flat properties that a variation is slight in a wide operating range with respect to a variation of the flow rate. For example, in the high pressure side compressor 13 of the embodiment, circumferential speeds of the impellers 20 may be minimized as possible. Specifically, in the high pressure side compressor 13 of the embodiment, the rotational speed according to the rated power output increased by the constant speed step-up gear 15 may be adjusted such that the impellers 20 are operated at the circumferential speeds of a Mach number of 0.8 or less.

As another configuration to obtain a head performance having flat properties in which a variation is slight in a wide operating range with respect to a variation of the flow rate, for example, in the high pressure side compressor 13 of the embodiment, the number of the impellers 20 may be increased as much as possible. Specifically, in the high pressure side compressor 13 of the embodiment, the number of the impellers 20 may be at least six or more with respect to one rotary shaft 13a.

In addition, in the compressor system 10 of the embodiment, the head transmitted from the driving machine 11 is not evenly distributed with respect to the low pressure side compressor 12 and the high pressure side compressor 13, and the head transmitted to the high pressure side compressor 13 rotated at a constant speed may be supplied from the driving machine 11 such that the head is larger than the head transmitted to the low pressure side compressor 12. In the embodiment, the head transmitted to the high pressure side compressor 13 may occupy 60% or more with respect to the entire head of the compressor system 10 transmitted from the driving machine 11 obtained by summing the head transmitted to the low pressure side compressor 12 and the head transmitted to the high pressure side compressor 13.

In the above-mentioned compressor system 10, as shown in FIG. 4A, the low pressure side compressor 12 can be operated with a variable rotational speed by varying the speed increasing ratio in the variable speed step-up gear 14. In the embodiment, the low pressure side compressor 12 is operated at the rotational speed of, for example, 70% to 100% with respect to the rated power output by varying the speed increasing ratio in the variable speed step-up gear 14.

FIG. 4A shows a relation between a flow rate of a working fluid and a head in the low pressure side compressor 12 when the low pressure side compressor 12 is operated at the rotational speed of, for example, 70% to 100% with respect to the rated power output. As shown in FIG. 4A, when the low pressure side compressor 12 is operated between a line L1 of 70% and a line L2 of 100% within a range of a surge line Ls or less, a relation between a flow rate and a head serving as a pressure difference between the inlet side and the outlet side is indicated by a range D1 having a predetermined region.

In addition, as shown in FIG. 4B, since the high pressure side compressor 13 is operated at a constant rotational speed because the speed increasing ratio of the constant speed step-up gear 15 is set to be constant. The high pressure side compressor 13 may be operated at a rotational speed as close to the rated power output as possible in order to maintain a high output (an outlet pressure) in the compressor system 10. In the embodiment, the high pressure side compressor 13 is operated at a rotational speed of, for example, 100% with respect to the rated power output.

FIG. 4B shows a relation between a flow rate of a working fluid and a head in the high pressure side compressor 13 when the high pressure side compressor 13 is operated at the rotational speed of, for example, 100% with respect to the rated power output. As shown in FIG. 4B, when the high pressure side compressor 13 is operated on a line L3 of 100% within a range of the surge line Ls or less, a relation between a flow rate and a head serving as a pressure difference between the inlet side and the outlet side is indicated by a range D2 shown in a linear shape.

In the compressor system 10, the working fluid compressed by the low pressure side compressor 12 and the high pressure side compressor 13 is output toward the process side. Here, when the low pressure side compressor 12 is operated within the range D1 shown in FIG. 4A and the high pressure side compressor 13 is operated within the range D2 shown in FIG. 4B, a relation between the flow rate and the outlet pressure of the working fluid output from the compressor system 10 is indicated by a range D3 shown in FIG. 4C. For this reason, in the compressor system 10, when the outlet pressure is maintained at a constant pressure P1, a line on which the range D3 and the pressure P1 overlap each other becomes an operating range D3a.

Here, provisionally, comparison between a case in which the step-up gear of the low pressure side compressor 12 side has a constant speed and a case in which the driving machine 11 has a variable speed is performed.

Comparative Example 1

Figure 5:
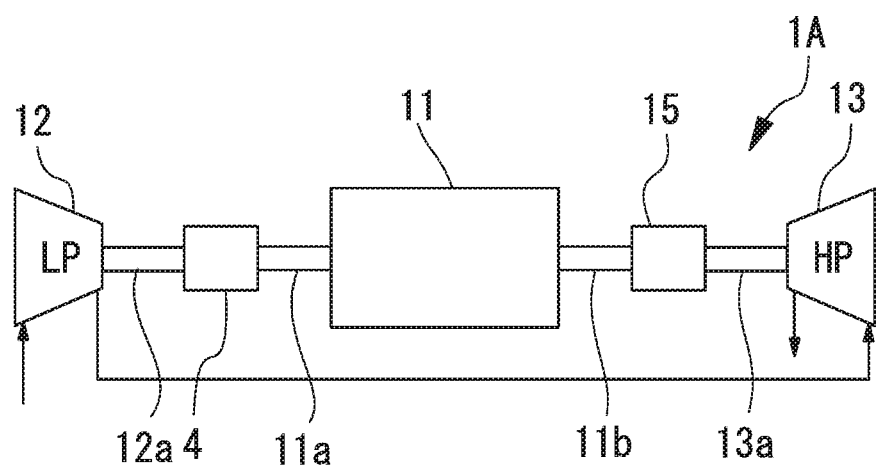
FIG. 5 is a view showing a schematic configuration of a comparative example of the compressor system according to the embodiment of the present invention.
Figure 6A:
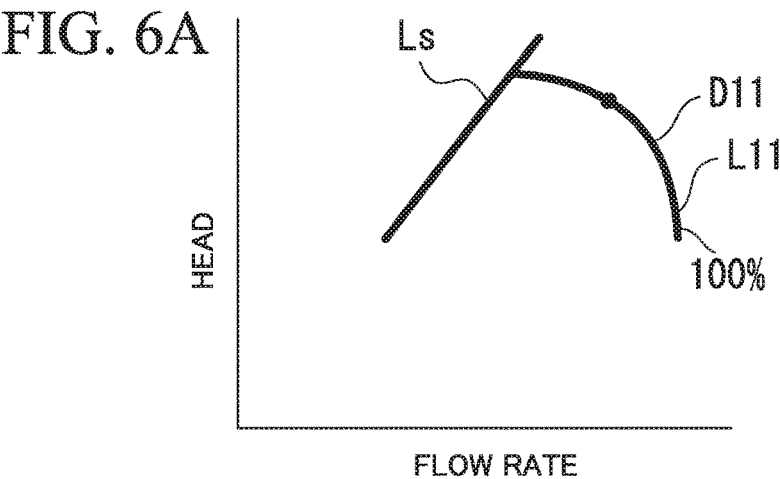
FIG. 6A is a view showing a relation between a flow rate and a head in a low pressure side compressor of a comparative example of the compressor system according to the embodiment of the present invention.
Figure 6B:
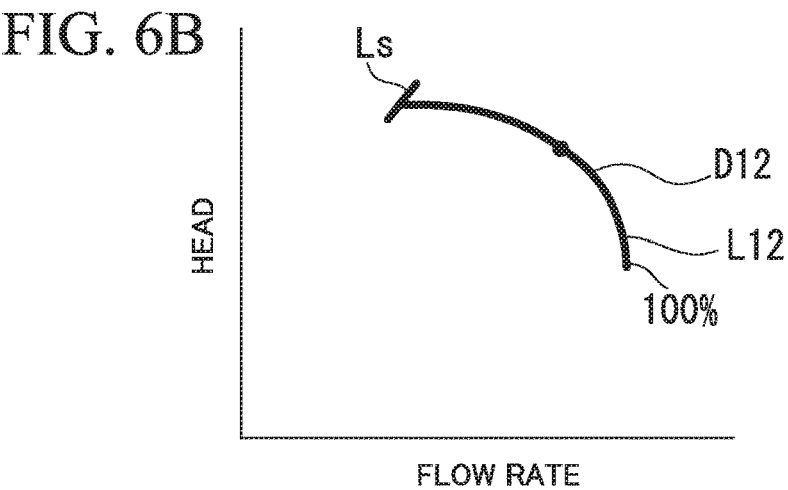
FIG. 6B is a view showing a relation between a flow rate and a head in a high pressure side compressor of a comparative example of the compressor system according to the embodiment of the present invention.
Figure 6C:
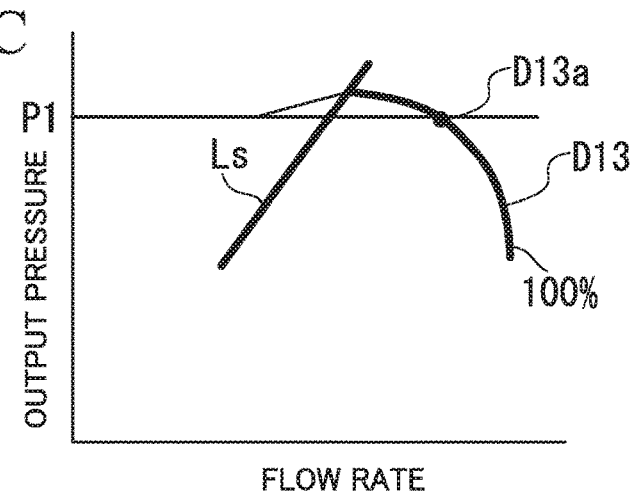
FIG. 6C is a view showing a relation between a flow rate and an outlet pressure of a comparative example of the compressor system according to the embodiment of the present invention.

FIG. 5 is a view showing a schematic configuration of Comparative example 1 of the compressor system according to the embodiment of the present invention. FIG. 6A is a view showing a relation between a flow rate and a head in the low pressure side compressor 12 of Comparative example 1 of the compressor system according to the embodiment of the present invention. FIG. 6B is a view showing a relation between a flow rate and a head in the high pressure side compressor 13 of Comparative example 1 of the compressor system according to the embodiment of the present invention. FIG. 6C is a view showing a relation between a flow rate and an outlet pressure of Comparative example 1 of the compressor system according to the embodiment of the present invention.

As shown in FIG. 5 and similar to the configuration of the embodiment shown in FIG. 1, a compressor system 1A serving as Comparative example 1 includes the driving machine 11, the low pressure side compressor 12, the high pressure side compressor 13 and the constant speed step-up gear 15. The compressor system 1A includes a constant speed step-up gear 4 whose speed increasing ratio is set to be constant and which is disposed between the driving machine 11 and the low pressure side compressor 12, instead of the variable speed step-up gear 14.

In the compressor system 1A having the above-mentioned configuration, as shown in FIG. 6A, since the speed increasing ratio of the constant speed step-up gear 4 is set to be constant, the compressor is operated at the constant rotational speed. For example, when the low pressure side compressor 12 is operated at the rotational speed of, for example, 100% with respect to the rated power output within the range of the surge line Ls or less, a relation between a flow rate and a head serving as a pressure difference between the inlet side and the outlet side is indicated by a range D11 shown in a linear shape on a line L11 of 100%.

In addition, as shown in FIG. 6B, the high pressure side compressor 13 is operated at the constant rotational speed because the speed increasing ratio of the constant speed step-up gear 15 is set to be constant. For example, when the high pressure side compressor 13 is operated at the rotational speed of, for example, the rated power output of 100% within a range of the surge line Ls or less, a relation between a flow rate and a head serving as a pressure difference between the inlet side and the outlet side is indicated by a range D12 shown in a linear shape on a line L12 of 100%.

Here, when the low pressure side compressor 12 is operated within the range D11 shown in FIG. 6A and the high pressure side compressor 13 is operated within the range D12 shown in FIG. 6B, a relation between the flow rate and the outlet pressure of the working fluid output from the compressor system 1A is indicated by a range D13 shown in FIG. 6C.

For this reason, as shown in FIG. 6C, when the outlet pressure is maintained at the constant pressure P1, the compressor system 1A may be operated at only the operating point D13a at which the range D13 and the pressure P1 overlap each other. In this way, in the compressor system 1A in which the driving machine 11, the low pressure side compressor 12 and the high pressure side compressor 13 are operated at only the constant rotational speed, when the outlet pressure is maintained at the constant pressure P1, the operating range is simply one point of an operating point D13a.

Comparative Example 2

Figure 7:
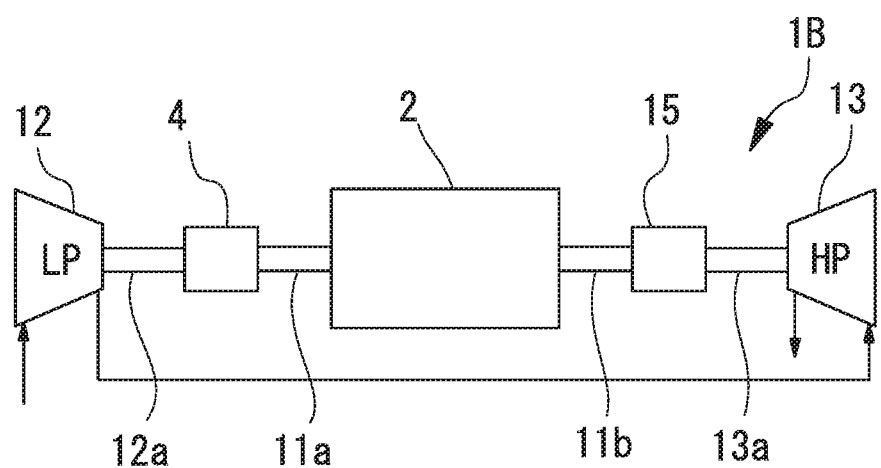
FIG. 7 is a view showing a schematic configuration of another comparative example of the compressor system according to the embodiment of the present invention.
Figure 8A:
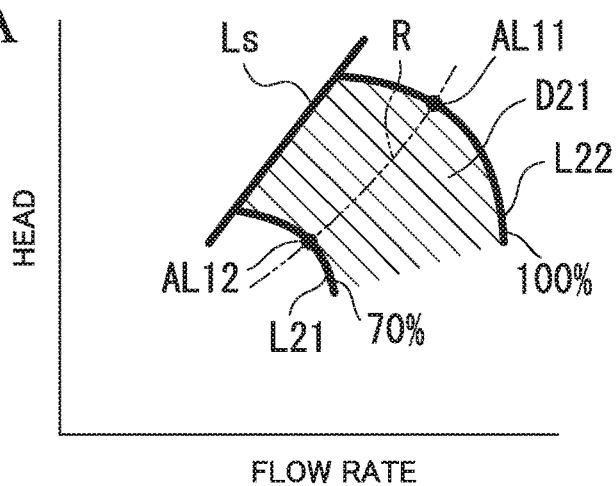
FIG. 8A is a view showing a relation between a flow rate and a head in a low pressure side compressor of the other comparative example of the compressor system according to the embodiment of the present invention.
Figure 8B:
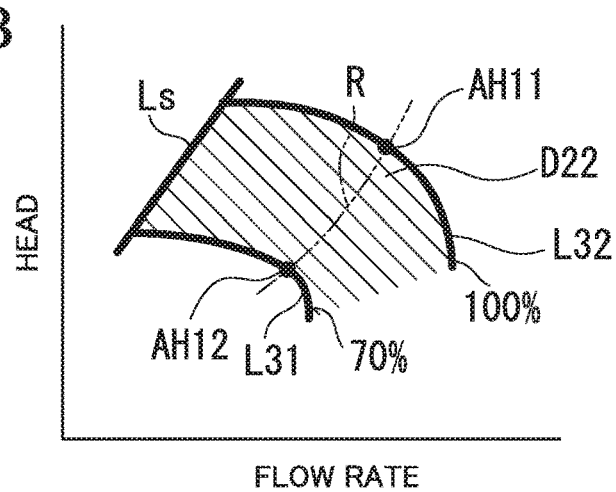
FIG. 8B is a view showing a relation between a flow rate and a head in a high pressure side compressor of the other comparative example of the compressor system according to the embodiment of the present invention.
Figure 8C:
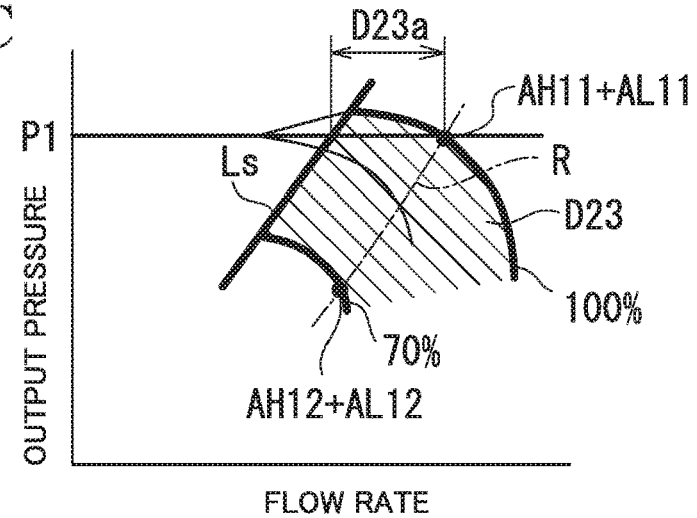
FIG. 8C is a view showing a relation between a flow rate and an outlet pressure of the other comparative example of the compressor system according to the embodiment of the present invention.

FIG. 7 is a view showing a schematic configuration of Comparative example 2 of the compressor system according to the embodiment of the present invention. FIG. 8A is a view showing a relation between a flow rate and a head in a low pressure side compressor of Comparative example 2 of the compressor system according to the embodiment of the present invention. FIG. 8B is a view showing a relation between a flow rate and a head in a high pressure side compressor of Comparative example 2 of the compressor system according to the embodiment of the present invention. FIG. 8C is a view showing a relation between a flow rate and an outlet pressure of Comparative example 2 of the compressor system according to the embodiment of the present invention.

As shown in FIG. 7, a compressor system 1B as Comparative example 2 includes a variable speed driving machine 2 constituted by a variable speed motor, the low pressure side compressor 12, the high pressure side compressor 13, and the constant speed step-up gears 4 and 15 whose speed increasing ratio is set to be constant.

In the above-mentioned compressor system 1B, as the rotational speed of the variable speed driving machine 2 constituted by the variable speed motor is varied, the numbers of revolutions of the low pressure side compressor 12 and the high pressure side compressor 13 are synchronized and varied.

In the compressor system 1B having the above-mentioned configuration, as shown in FIG. 8A, the low pressure side compressor 12 can be operated at the rotational speed of, for example, 70% to 100% with respect to the rated power output according to a variation of the rotational speed of the variable speed driving machine 2. FIG. 8A shows a relation between a flow rate of a working fluid and a head in the low pressure side compressor 12 when the low pressure side compressor 12 is operated at the rotational speed of, for example, 70% to 100% with respect to the rated power output within the range of the surge line Ls or less. The relation between the flow rate and the head serving as the pressure difference between the inlet side and the outlet side in the low pressure side compressor 12 is indicated by a range D21 having a predetermined range between a line L21 of 70% and a line L22 of 100%.

In the meantime, in the compressor system 1B, as shown in FIG. 8B, the high pressure side compressor 13 can be operated at the rotational speed of, for example, 70% to 100% with respect to the rated power output within a range of the surge line Ls or less according to a variation in the rotational speed of the variable speed driving machine 2. FIG. 8B shows a relation between a flow rate of a working fluid and a head in the low pressure side compressor 12 when the high pressure side compressor 13 is operated at the rotational speed of, for example, 70% to 100% with respect to the rated power output. The relation between the flow rate and the head serving as the pressure difference between the inlet side and the outlet side in the high pressure side compressor 13 is indicated by a range D22 having a predetermined region between a line L31 of 70% and a line L32 of 100%.

In the compressor system 1B, when the low pressure side compressor 12 is operated within the range D21 shown in FIG. 8A and the high pressure side compressor 13 is operated within the range D22 shown in FIG. 8B, the relation between the flow rate and the outlet pressure of the working fluid output from the compressor system 1B is indicated by a range D23 shown in FIG. 8C.

In the above-mentioned compressor system 1B, when the outlet pressure is maintained at the constant pressure P1, a line on which the range D23 and the pressure P1 overlap each other is an operating range D23a.

(Comparison Between Compressor System 10 of Embodiment and Comparative Examples 1 and 2)

As shown in FIG. 6C, in the compressor system 1A of Comparative example 1 in which the driving machine 11 and the constant speed step-up gears 4 and 15 are at a constant speed, when the outlet pressure is maintained at the constant pressure P1, the operation can be performed only at the one operating point D13a. However, a load occurs due to a circumstance of the process side in which the working fluid supplied from the high pressure side compressor 13 and the low pressure side compressor 12 is used, and operating conditions such as a flow rate or the like vary. When variation occurs, the constant outlet pressure cannot be maintained but deviates from the operating point D13a. Accordingly, it is difficult to stably operate the compressor system 1A while maintaining a constant outlet pressure according to requirements of the process side in the first place.

In the meantime, as shown in FIG. 8C, in the compressor system 1B of Comparative example 2 in which the speed of the variable speed driving machine 2 is varied, when the outlet pressure is maintained at the constant pressure P1, the compressor system can be operated within the operating range D23a. However, when the rotational speed of the variable speed driving machine 2 is varied to adjust the flow rate, the numbers of revolutions of both of the low pressure side compressor 12 and the high pressure side compressor 13 vary and the outlet pressure varies greatly. In particular, when the rotational speed is reduced to, for example, about 70% with respect to the rated power output, the heads of the low pressure side compressor 12 and the high pressure side compressor 13 are simultaneously decreased. As a result, the outlet pressure of the compressor system 1B decreases greatly. Accordingly, the operating range D23a in which the compressor system 1B can be operated while maintaining the outlet pressure at a constant value according to requirements of the process side is narrower than the operating range D3a of the compressor system 10, which will be described below.

With respect to Comparative examples 1 and 2, as shown in FIG. 4C, in the compressor system 10 of the embodiment in which the driving machine 11 has a constant speed and the step-up gear of the low pressure side compressor 12 serves as the variable speed step-up gear 14, the compressor is operated within the range D3. In this configuration, even when the speed increasing ratio of the variable speed step-up gear 14 is varied to adjust the flow rate, the rotational speed of the high pressure side compressor 13 does not vary. For this reason, the high pressure side compressor 13 can compress the working fluid having a small flow rate while maintaining the rotational speed, and the head can be increased. Accordingly, the operating range in which the compressor can be operated while the outlet pressure is held at the constant value according to requirements of the process side may be the operating range D3a that is wider than this.

Specifically, a case in which the numbers of revolutions of the compressor system 1B of Comparative example 2 and the compressor system 10 of the embodiment are simply varied in a state in which the systems are operated within the ranges D23 and D3 will be exemplarily described.

As shown in FIGS. 8A, 8B and 8C, in the compressor system 1B of Comparative example 2, the operation transitions from the state of the rotational speed of 100% to the state of the rotational speed of 70%, and the operation states of both of the low pressure side compressor 12 and the high pressure side compressor 13 are changed from operating points AL11 and AH11 to operating points AL12 and AH12 along a process resistance wire R. In this way, in the compressor system 1B of Comparative example 2, since the head is also decreased in the high pressure side compressor 13 together with the low pressure side compressor 12, the outlet pressure of the compressor system 1B decreases greatly.

On the other hand, in the compressor system 10 of the embodiment, as shown in FIGS. 4A and 4B, when the operation state is transferred from the state of the rotational speed of 100% to the rotational speed of 70%, the operation state of the low pressure side compressor 12 is changed from an operating point AL1 to an operating point AL2 along the process resistance wire R. In the meantime, in the high pressure side compressor 13, since the rotational speed is maintained at the rotational speed of 100%, the rotational speed changes on the line L3 of 100%. Specifically, as the rotational speed is varied and the flow rate is decreased in the low pressure side compressor 12, the rotational speed is transferred from an operating point AH1 to an operating point AH2 on the line L3, and the head is increased. Accordingly, the outlet pressure of the compressor system 10 can be prevented from greatly decreasing.

According to the above-mentioned configuration, when the rotational speed of the low pressure side compressor 12 is varied by the variable speed step-up gear 14 while driving the high pressure side compressor 13 at the constant rotational speed and the compressor is operated such that the constant outlet pressure is maintained, the compressor system 10 can be operated within the wide operating range D3a. Accordingly, even when the compressor is operated while the outlet pressure is constant, a wider operating range D3a can be secured and a stable operation can be performed.

In addition, a decrease in outlet pressure of the compressor system 10 can be suppressed and the output can be stably held while widening the operating range by holding the constant rotational speed of the high pressure side compressor 13 in a state in which the rotational speed of the low pressure side compressor 12 is varied.

Further, as the head by the high pressure side compressor 13 operated via the constant speed step-up gear 15 occupies 60% or more of the entire head, when the flow rate is adjusted by the low pressure side compressor 12, the variation can be extremely suppressed and the operation can be stably performed.

In addition, in the high pressure side compressor 13 operated via the constant speed step-up gear 15, as the circumferential speed of the impellers 20 is a Mach number of 0.8 or less and the number of impellers 20 is six (six stages) or more, a wide operating range that is flatter than that of the low pressure side compressor 12 may be provided.

EXAMPLE

Hereinafter, while the embodiment of the present invention according to the example has been described in detail, the embodiment of the present invention is not limited by the following description.

Figure 9B:
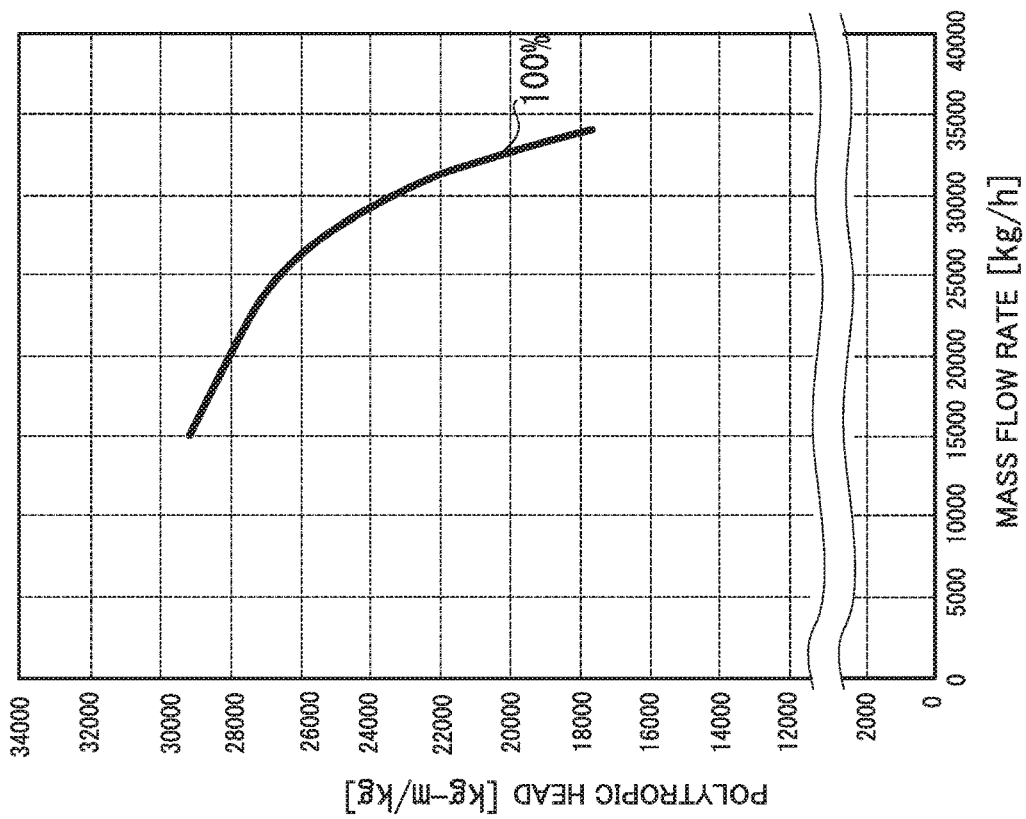
FIG. 9B is a view showing a relation between a mass flow rate and a head in a high pressure side compressor of the compressor system according to the example of the present invention.
Figure 9A:
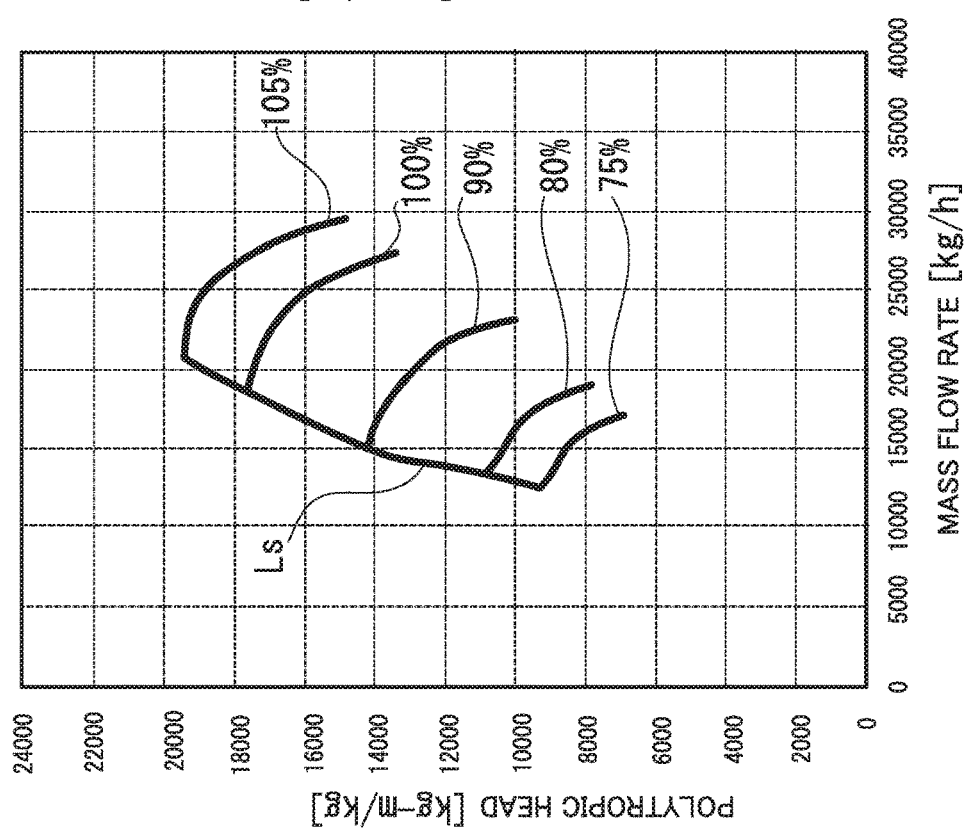
FIG. 9A is a view showing a relation between a mass flow rate and a head in a low pressure side compressor of a compressor system according to an example of the present invention.
Figure 9C:
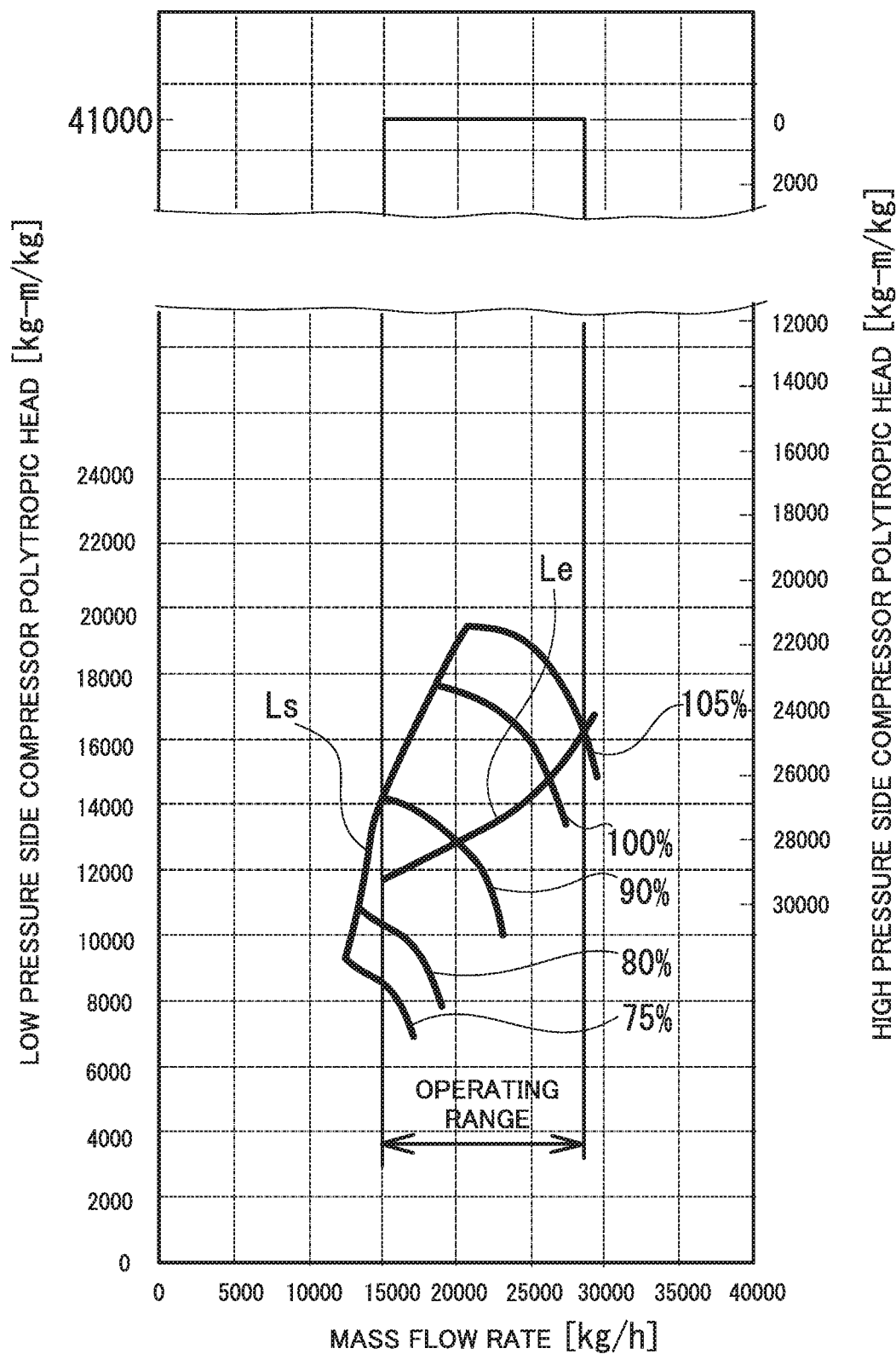
FIG. 9C is a view showing a state in which a relation between the mass flow rate of the compressor system and heads of the low pressure side compressor and the high pressure side compressor according to the example of the present invention is arrange

FIG. 9A is a view showing a relation between a mass flow rate and a head in a low pressure side compressor of a compressor system according to an example of the present invention. FIG. 9B is a view showing a relation between a mass flow rate and a head in a high pressure side compressor of the compressor system according to the example of the present invention. FIG. 9C is a view showing a state in which a relation between the mass flow rate of the compressor system and heads of the low pressure side compressor and the high pressure side compressor according to the example of the present invention is arranged.

In the compressor system of the example, as shown in FIG. 9A, the low pressure side compressor can be operated at the rotational speed of 75% to 105% with respect to the rated power output according to the variation in rotational speed of the driving machine. FIG. 9A shows a relation between the mass flow rate of the working fluid and the head in the low pressure side compressor when the low pressure side compressor is operated at the rotational speed of, for example, 75% to 105% with respect to the rated power output within a range of the surge line Ls or less.

In addition, as shown in FIG. 9B, the high pressure side compressor is operated at the constant rotational speed because the speed increasing ratio of the constant speed step-up gear is fixed. In the example, the high pressure side compressor is operated at the rotational speed of 100% with respect to the rated power output. FIG. 9B shows a relation between the mass flow rate of the working fluid and the head in the high pressure side compressor when the high pressure side compressor is operated at the rotational speed of 100% with respect to the rated power output.

Here, FIG. 9C shows a state in which a relation between the head of the low pressure side compressor and the head of the high pressure side compressor with respect to the mass flow rate is arranged. Specifically, FIG. 9C is a view in which FIG. 9B that showing the relation between the mass flow rate and the head of the working fluid of the high pressure side compressor is reversed to overlap FIG. 9A showing the relation between the mass flow rate and the head of the working fluid of the low pressure side compressor to match the values of the mass flow rate serving as a lateral axis.

As shown in FIG. 9C, in the compressor system of the example, for example, provided that the head of the entire compressor system is uniformly 41000 [kg-m/kg] with respect to the mass flow rate while the outlet pressure of the compressor system is at a constant value, an operating line Le on which the constant head of the entire compressor system is held at 41000 [kg-m/kg] is obtained.

In the above-mentioned compressor system, for example, when the rotational speed of the low pressure side compressor is decreased from 100% to 90%, the head is reduced from about 15000 [kg-m/kg] to about 13000 [kg-m/kg]. Here, the mass flow rate of the compressor system is decreased from about 27000 [kg/h] to about 20000 [kg/h]. Incidentally, as the mass flow rate is decreased to about 20000 [kg/h], the head of the high pressure side compressor is increased from about 26000 [kg-m/kg] to about 28000 [kg-m/kg].

That is, the compressor system of the example can increase the head to an extent decreased by the high pressure side compressor even when the rotational speed of the low pressure side compressor is varied to decrease the mass flow rate as the compressor is operated on the operation line Le. Accordingly, in the entire compressor system, a decrease in outlet pressure can be suppressed and the compressor can be operated while maintaining the constant outlet pressure at 41000 [kg-m/kg] while the operating range is widened by varying the rotational speed of the low pressure side compressor.

Accordingly, in the compressor system of the example, as shown in FIG. 9C, the operating range can be increased to a wide region of about 15000 [kg/h] to about 28000 [kg/h].

In addition, as described in the compressor system of the example, the head of the high pressure side compressor operated while the rotational speed is constant is 60% of the head of the entire compressor system. Specifically, a maximum mass flow rate when the compressor system of the example is operated while the outlet pressure is held at 41000 [kg-m/kg] is about 28000 [kg/h] in the operating range. The head of the high pressure side compressor at this time is about 24600 [kg-m/kg] from FIG. 9C. Accordingly, the head of the high pressure side compressor operated while the rotational speed is constant occupies 60% of the head of the entire compressor system.

Other Embodiments

Further, the present invention is not limited to the above-mentioned embodiment and design changes may be made without departing from the spirit of the present invention.

For example, in the embodiment, while the rotational speed of the low pressure side compressor 12 is varied by the variable speed step-up gear 14, instead of the low pressure side compressor 12, the variable speed step-up gear 14 may be provided at the high pressure side compressor 13 and the rotational speed of the high pressure side compressor 13 may be varied.

In addition, in the embodiment, while the variable speed step-up gear 14 is provided at the low pressure side compressor 12 side and the constant speed step-up gear 15 is provided at the high pressure side compressor 13, at least one of these may not be the step-up gear but may be a reduction gear.

In addition, in the configuration in which the low pressure side compressor 12 and the high pressure side compressor 13 are driven in the one driving machine 11, an inlet guide vane (IGV) may be used at an inlet of the compressor in order to vary the rotational speed of only one of the low pressure side compressor 12 and the high pressure side compressor 13. However, according to the configuration of the embodiment, in comparison with the case in which only the IGV is installed, a wider operating range can be obtained while an operating efficiency is improved in not only the planned operating point but also an operating zone other than the planned operating point.

INDUSTRIAL APPLICABILITY

In a compressor system for driving a first compressor and a second compressor using a driving machine, as a variable speed step-up gear is installed between the first compressor and the driving machine and a constant speed step-up gear is installed between the second compressor and the driving machine, a wider operating condition range can be secured and a stable operation can be performed.

REFERENCE SIGNS LIST

10 Compressor system
11 Driving machine
11a First output shaft
11b Second output shaft
12 Low pressure side compressor (first compressor)
13 High pressure side compressor (second compressor)
12a, 13a Rotary shaft
14 Variable speed step-up gear
15 Constant speed step-up gear
20, 21, 22, 23, 24, 25, 26 Impeller
30 Disk
40 Blade
50 Cover
2 Variable speed driving machine

The invention claimed is:
1. A compressor system comprising:
a driving machine having a first output shaft that is rotatably driven, and a second output shaft that is rotatably driven to have the same rotational speed as the first output shaft;

a first compressor configured to receive rotation of the first output shaft and compress a working fluid;

a second compressor configured to receive rotation of the second output shaft and compress a working fluid;

a variable speed step-up gear configured to increase the rotational speed of the first output shaft to transmit the rotational speed to the first compressor and vary the increased rotational speed; and a constant speed step-up gear configured to increase the rotational speed of the second output shaft to transmit the rotational speed to the second compressor and cause the increased rotational speed to be constant, wherein the first output shaft is disposed coaxially with the second output shaft and is disposed at an opposite side to the second output shaft with driving machine interposed therebetween.

2. The compressor system according to claim 1, wherein the first compressor is a low pressure side compressor, and the second compressor is a high pressure side compressor.

3. The compressor system according to claim 1, wherein the second compressor is operated at a circumferential speed, which is a Mach number of 0.8 or less, of an impeller that compresses the working fluid by rotation.

4. The compressor system according to claim 3, wherein the second compressor has at least six impellers configured to compress the working fluid by rotation.

5. The compressor system according to claim 1, wherein a head transmitted from the driving machine to the second compressor occupies 60% or more of a total head transmitted from the driving machine obtained by summing a head transmitted to the first compressor and a head transmitted to the second compressor.

* * * * *